United States Patent [19]

Hill

[11] 3,989,117

[45] Nov. 2, 1976

[54] HYDRAULIC DRIVE SYSTEM FOR A WORK VEHICLE OR TRACTOR

[76] Inventor: Bernard E. Hill, P.O. box 1535, 2437 SW. Olson St., Pendleton, Oreg. 97801

[22] Filed: Apr. 14, 1975

[21] Appl. No.: 567,735

[52] U.S. Cl. ................................ 180/66 R; 91/176; 91/210; 91/478; 91/481; 91/482; 91/492; 180/6.48

[51] Int. Cl.[2] ...................... B60K 7/00; B62D 11/04

[58] Field of Search ............... 180/66 R, 66 F, 66 B, 180/66 C, 6.48, 6.3, 67, 62, 59, 8, 56, 55; 91/481, 480, 478, 476, 492, 482, 472, 491, 210, 176

[56] References Cited

UNITED STATES PATENTS

| | | | |
|---|---|---|---|
| 644,598 | 3/1900 | Heggem | 91/176 X |
| 1,645,761 | 10/1927 | Le Duc | 91/210 X |
| 2,505,951 | 5/1950 | Feaster | 180/66 R X |
| 2,651,377 | 9/1953 | Lapsley et al. | 180/6.3 |
| 2,681,117 | 6/1954 | Marcy | 180/66 R |
| 3,035,553 | 5/1962 | Feaster | 91/481 |
| 3,220,316 | 11/1965 | Kummerman | 91/176 |
| 3,485,315 | 12/1969 | Bergren | 180/66 R |
| 3,581,682 | 6/1971 | Kontranowski | 180/66 F X |

FOREIGN PATENTS OR APPLICATIONS

| | | | |
|---|---|---|---|
| 346 | 1909 | United Kingdom | 180/56 |

*Primary Examiner*—Robert R. Song
*Assistant Examiner*—Milton L. Smith
*Attorney, Agent, or Firm*—Lee R. Schermerhorn

[57] ABSTRACT

Each of two drive wheels on a vehicle is independently driven by a wheel motor having four single acting hydraulic cylinders. Both wheel motors are supplied by a common engine driven pump. Two forward speeds are provided by a valve arrangement which can circulate the hydraulic fluid through all four, or only two, cylinders of each motor. Valves in a pair of valve units are shifted rapidly by camshafts and snap acting mechanisms to control the motor cylinders. Reverse drive is accomplished by a timing adjustment of the camshafts. The conventional gear differential, speed change gears and reversing gears are thereby eliminated.

10 Claims, 13 Drawing Figures

12
13
14
15
17
18
19
21
22
26
27
32
33
35
36
37
41
55
61
62
69
90
96
98
140
141
143
144
145
153
157
165
166
167
168
169
170
171
172
185

Fig. 7
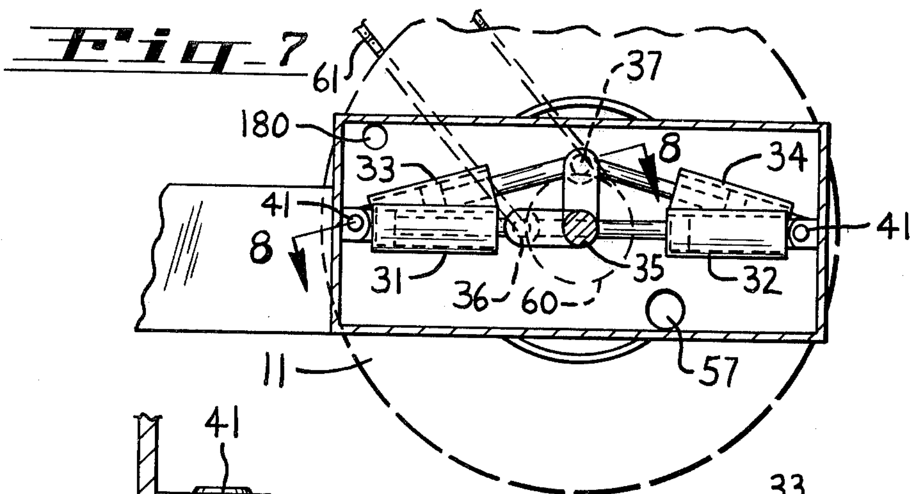
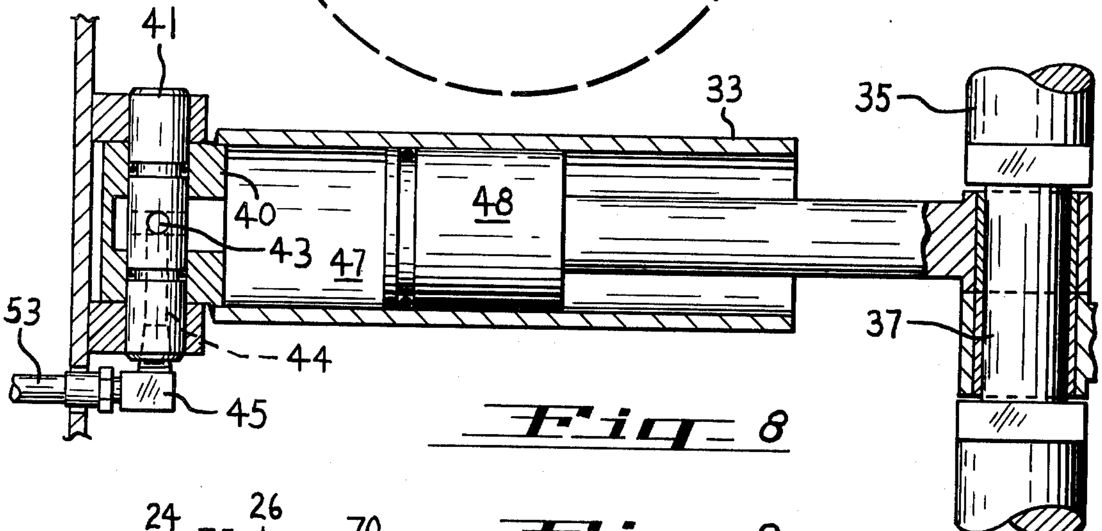
Fig. 8
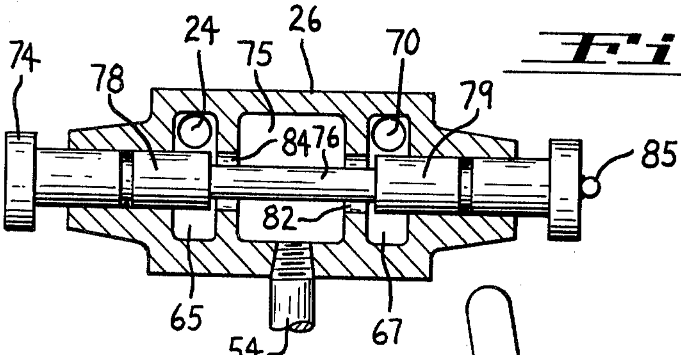
Fig. 9
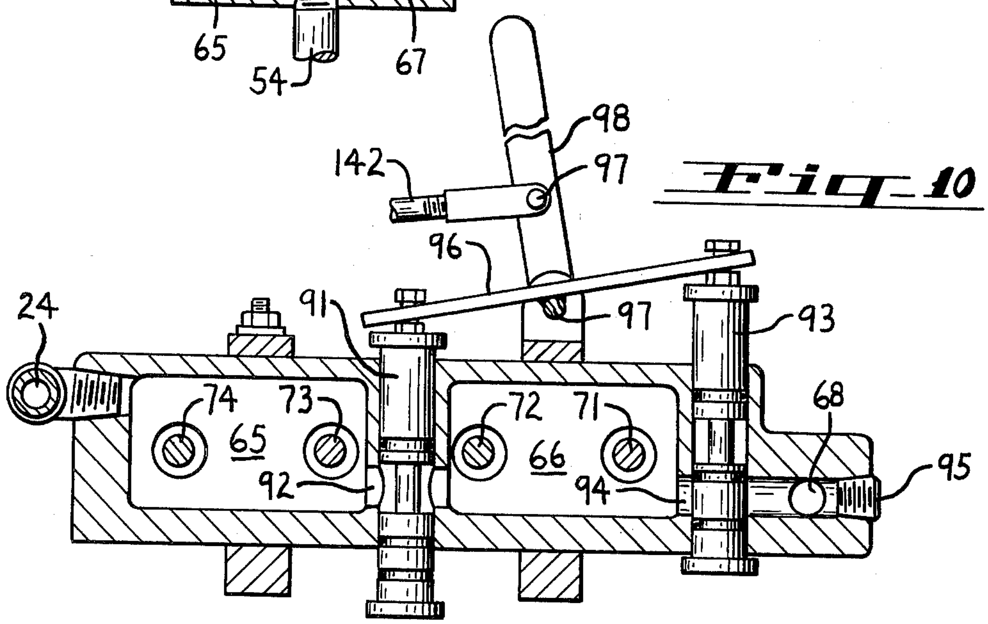
Fig. 10

HYDRAULIC DRIVE SYSTEM FOR A WORK VEHICLE OR TRACTOR

BACKGROUND OF THE INVENTION

This invention relates to a hydraulic drive system for work vehicles such as farm machinery and tractors.

In conventional vehicles of this type, power is transmitted from an engine to the drive wheels through the various shafts and gears similar to the drive systems employed in auto trucks and passenger automobiles. The conventional drive components comprise a clutch, gear box including speed change and reversing gears, longitudinal drive shaft, differential gears and an axle shaft for each drive wheel. All these rotating parts require high quality bearings.

It is desired to provide a less complicated and expensive drive system for work vehicles which eliminates the expensive and complicated components of conventional drive systems along with the servicing and maintainance requirements which are necessary to keep conventional drive systems in good operating condition.

Objects of the present invention are therefore, to provide an improved drive system for tractors and other work vehicles, to provide a drive system which eliminates the conventional clutch, speed change gear box, differential gears, long drive and axle shafts and bearings for all of these rotating parts, and to provide a hydraulic drive system having the simplicity and efficiency of power transmission of a steam engine.

SUMMARY OF THE INVENTION

In the present drive system each of two drive wheels on the vehicle is independently driven by a wheel motor having hydraulic cylinders. Both wheel motors are supplied by a common engine driven pump.

Two forward speeds are provided by a valve arrangement which can circulate the hydraulic fluid through all or fewer than all of the cylinders of each motor. Reverse drive is accomplished by a camshaft timing adjustment. The conventional gear differential, speed change gears, reversing gears, shafting and bearings for all of these rotating parts are thereby eliminated.

The functions of the conventional gear box are performed by simple valve arrangements which are relatively inexpensive to manufacture and require relatively little maintenance in operation. Trouble-free performance is especially important in farm equipment where a breakdown at a critical time may mean the loss of a crop.

The invention will be better understood and additional objects and advantages will become apparent from the following description of certain preferred embodiments illustrated in the accompanying drawings. Various changes may be made, however, in the details of construction and arrangement of parts and certain features may be employed without others. All such modifications within the scope of the appended claims are included in the invention.

BRIEF DESCRIPTION OF THE DRAWINGS

FIG. 7 is a side elevation view with parts broken away showing a wheel motor;

FIG. 8 is an enlarged view on the line 8—8 in FIG. 7.

FIG. 9 is a sectional view showing a feature of the valves in FIGS. 3–6;

FIG. 10 is a sectional view on the line showing one of the speed change valves;

DESCRIPTION OF THE PREFERRED EMBODIMENTS

Figure 1:
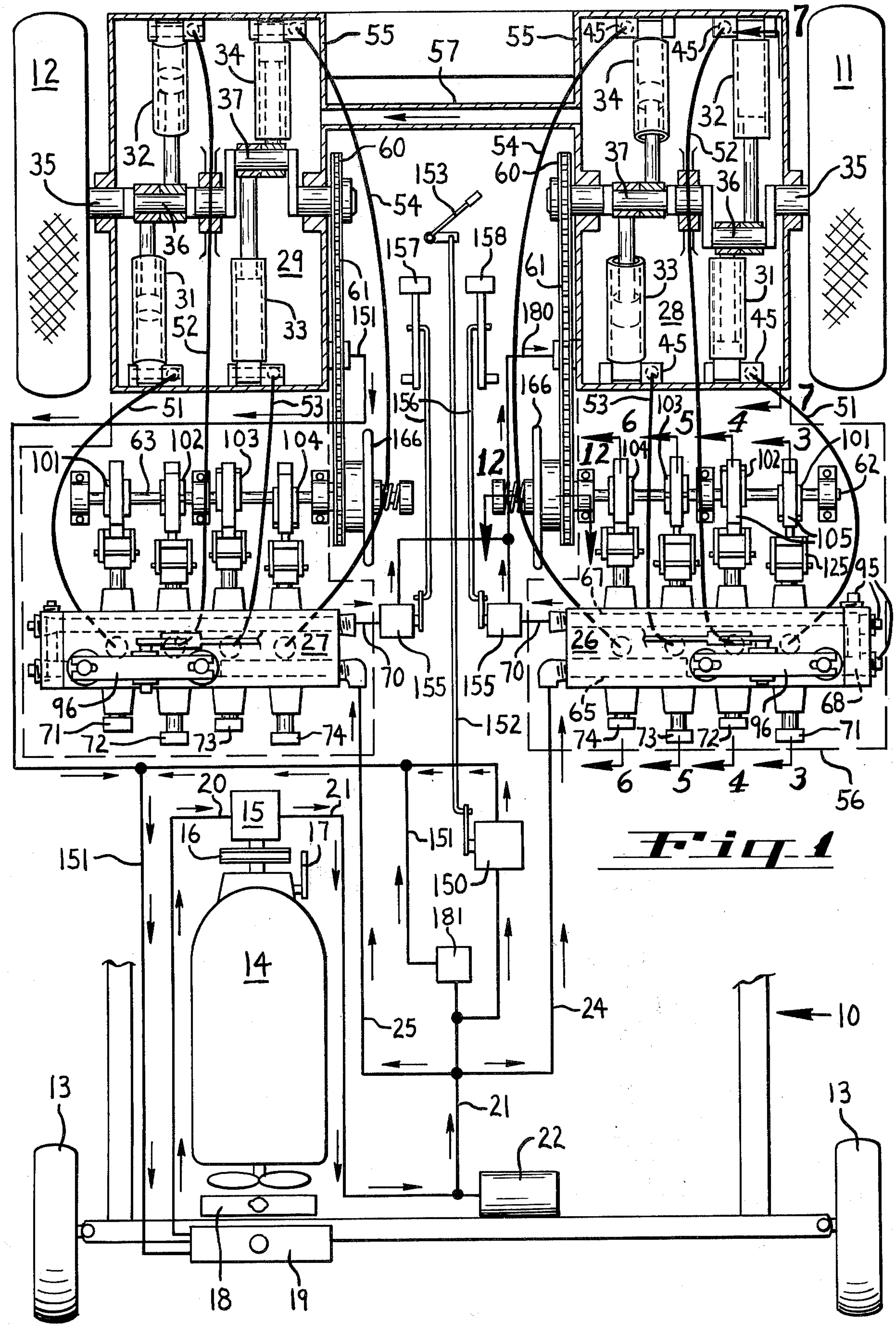
FIG. 1 is a schematic plan view of a swather embodying the invention.

FIG. 1 is a schematic representation of a farm vehicle 10 such as a swather. The vehicle is driven by its front wheels 11 and 12 and is steered by its rear wheels 13. The motive power preferably comprises an internal combustion engine 14 which drives a hydraulic pump 15 through a clutch 16. Clutch 16 may be engaged and disengaged by a lever 17. Associated with internal combustion engine 14 are radiator 18 for the engine coolant and a radiator 19 to cool the hydraulic fluid which is circulated by pump 15.

A conduit 20 supplies the inlet side of pump 15 with hydraulic fluid from radiator 19 and a conduit 21 connected with the discharge side of the pump supplies hydraulic fluid under pressure for driving the vehicle. Conduit 21 is connected to a pressure accumulator 22, a pressure line 24 for driving the right wheel 11 and a pressure line 25 for driving the left wheel 12. Pressure line 24 is connected to a valve unit 26 for controlling the flow of hydraulic fluid through a wheel motor 28 for wheel 11 and pressure line 25 is connected to a valve unit 27 for controlling the flow of hydraulic fluid through a wheel motor 29 for the wheel 12.

Each wheel motor preferably comprises four single acting hydraulic cylinders 31, 32, 33, and 34. Wheel 11 is mounted on a crank shaft 35 having two crank pins 36 and 37 in right angle relationship as shown in FIG. 7. The pistons in cylinders 31 and 32 are connected to crank pin 36 and the pistons in cylinders 33 and 34 are connected to crank pin 37.

Each cylinder is pivotally mounted as shown in FIG. 8 in the case of cylinder 33. Thus, cylinder head 40 is mounted for rotation on a horizontal pin 41 in a machine frame bracket 42. Pin 41 has openings 43 communicating with the head end of the cylinder, and an axial opening 44 communicating with a hydraulic fitting 45. Hydraulic pressure in fitting 45 thereby enters the working chamber 47 of the cylinder to drive piston 48 outward during a half revolution of crank shaft 35. In the next half revolution of the crank shaft piston 48 moves inwardly in cylinder 33 discharging hydraulic fluid from chamber 47 through fitting 45.

In order to provide a compact wheel motor the supporting pins 41 for cylinders 31 and 33 are axially aligned in the horizontal plane of crankshaft 35 on one side of the crankshaft and supporting pins 41 for cylinders 32 and 34 are axially aligned in the same horizontal plane on the opposite side of the crankshaft. As indicated in FIG. 1, each cylinder is equipped with a hydraulic connecter fitting 45 whereby cylinder 31 is connected to hydraulic line 51, cylinder 32 is connected to hydraulic line 52, cylinder 33 is connected to hydraulic line 53 and cylinder 34 is connected ty hydraulic line 54. These hydraulic lines are connected to the valve unit 26.

The hydraulic motor 29 for wheel 12 is identical to the motor 28 just described for wheel 11 and is connected by corresponding hydraulic lines with the valve unit 27. Each motor is contained in a sump housing or tank 55 to contain any leakage from the cylinders and the sump housings are extended as indicated diagramatically by broken lines 56 to contain the associated valve units 26 and 27 and contain any leakage from the valve units. The two sump housings 55 are interconnected by pipe 57.

As seen in FIGS. 1 and 7 crankshaft 35 carries a sprocket 60 for driving a chain 61 to rotate an identical sprocket on a camshaft 62 whereby the camshaft rotates in the same direction and at the same speed as crankshaft 35. In a similar manner the crankshaft for wheel 12 rotates a camshaft 63 on the opposite side of the vehicle.

With reference to FIGS. 1 and 10 the valve unit 26 comprises a casting containing a plurality of chambers and bores. On the rear side of the valve unit in FIG. 1 line 24 connects directly with a first pressure chamber 65 and may also be put into communication with a second pressure chamber 66. On the front side of the valve unit a relief or discharge chamber 67 extends the entire length of the valve unit and includes an end bore 68. Relief chamber 67 is connected to external relief or discharge line 70.

Valve unit 26 also contains four identical sliding spool valves, 71, 72, 73 and 74. A separate chamber 75 surrounds the intermediate portion of each spool valve and is connected to a hydraulic line leading to the cylinder controlled by that valve as shown in FIGS. 3–6. Each spool valve has a reduced central portion 76 between two enlarged end portions 78 and 79.

As best shown in FIG. 9, relief chamber 67 is separated from each chamber 75 by a vertical wall 81 having a port 82 for each valve 71–74. Pressure chambers 65 and 66 are separated from the chambers 75 by a vertical wall 83 having a port 84 for each valve 71-74. For a reason which will be presently explained, the reduced portion 76 of each valve has a length exceeding the width of chamber 75 plus the combined thicknesses of walls 81 and 83, so that both ports 82 and 84 cannot be closed at the same time by the enlarged end portions 78 and 79. The valves, however, never pause in mid position as shown in FIG. 9.

Each valve is shifted to extreme right or left positions in a quick movement by a transverse rod 85 welded on one end of the valve member. Thus, when each valve is shifted to the left, port 84 is opened allowing hydraulic fluid to flow from pressure conduit 24 through chamber 65, port 84, chamber 75, and one of the hydraulic lines 51-54 to the cylinder connected to that line. When each valve is shifted to the right in FIG. 9 hydraulic fluid discharged from the corresponding cylinder flows through chamber 75 and port 82 to relief chamber 67. The spacing of the enlarged end portions 78 and 79 on the valves so that both ports 82 and 84 cannot be closed simultaneously prevents a momentary hydraulic lock in the fluid system while the valve is shifting right to left or left to right. No valve ever remains or pauses in the mid position as shown in FIG. 9.

The valve movements will presently be described with reference to FIGS. 3–6, which show the positions of the four valves 71-74 during forward travel of the vehicle at a particular instant when the pistons in the four cylinders 31-34 are in the relative positions shown in FIGS. 1 and 7. The flow paths of the hydraulic fluid are those which occur when speed change valve mechanism 90 is in low speed position, as shown in FIG. 10.

Figure 3:
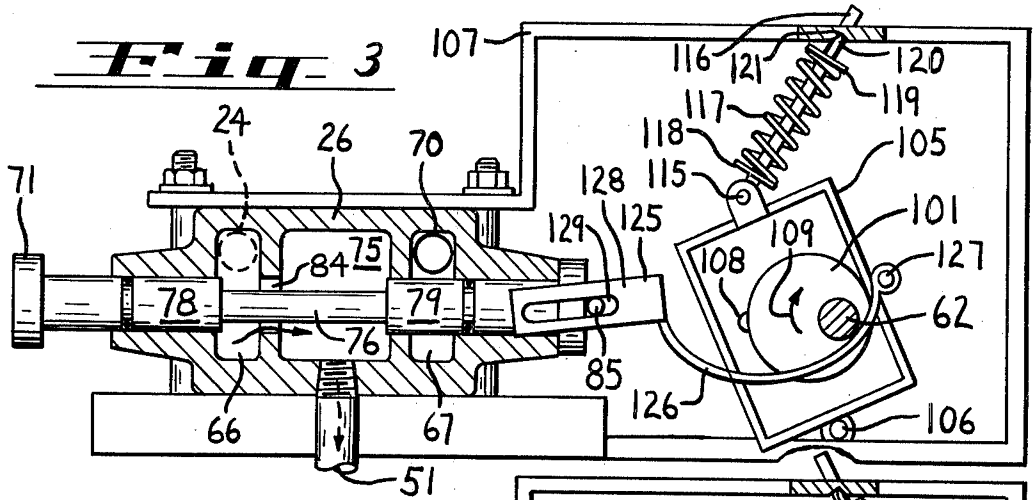
FIGS. 3–6 are views on the line 3—3, 4—4, 5—5 and 6—6 in FIG. 1 showing certain valve movements controlling the hydraulic flow to a wheel motor.
Figure 4:
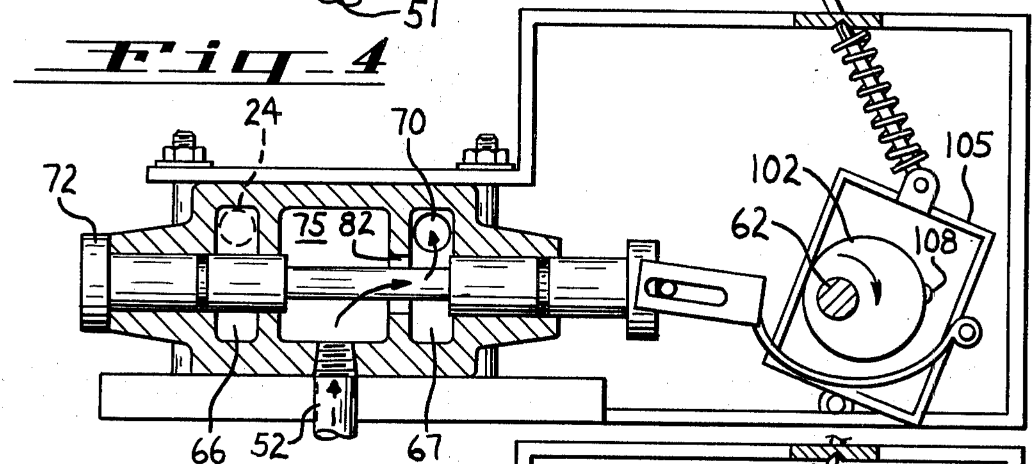

In low speed position, speed change valve 91 is in its lower position putting chamber 66 in communication with pressure chamber 65 and speed change valve 93 is in raised position, closing port 94 between chamber 66 and chambers 68, 67. The latter chambers are closed from external communication by the three plugs 95 in FIGS. 1 and 10. Valves 91 and 93 are reciprocated in opposite directions by a rocker arm 96, which is pivotally mounted at 97 for actuation by a lever 98. Thus, in low speed forward travel, chamber 66 in FIGS. 3 and 4 is subject to the same hydraulic pressure and flow conditions as chamber 65 in FIGS. 5 and 6.

Referring now to FIGS. 1 and 3–6, camshaft 62 has a cam 101 for actuating the valve 71, a cam 102 for actuating valve 72, a cam 103 for actuating the valve 73 and a cam 104 for actuating the valve 74. The actuating mechanisms provide a quick shift of each valve from one extreme position to the other, without any pause or delay in intermediate positions.

For this purpose each cam rotates in a cage 105 which is pivotally mounted at 106 for operation in a supporting frame 107. The high point of each cam is provided with a protuberance 108 to shift the cage 105 quickly with a snap action as the cam rotates. Each cage 105 is wider than the widest dimension of the cam. Arrows 109 indicate the direction of rotation in forward travel of the vehicle.

At its top, each cage 105 is pivotally connected at 115 with a spring guide rod 116 extending through an opening in the top of frame 107. Each rod 116 carries a compression spring 117 seated on a lower washer 118 fixed to rod 116 and having an upper end bearing against a washer 119 through which the rod 116 may slide. Washer 119 is equipped with a knife edge fulcrum 120 which is arranged to rock in a depression seat 121 in frame 107. Thus, the cages 105 are mounted for rapid snap action movement between extreme left and right positions without any delay or pause in such movements.

The movements of each cage 105 are transmitted to the valve members by a resilient link 125 having a pair of bowed spring arms 126 connected at their free ends to a pivot pin 127 on the cage. The other end of each link 125 carries a stirrup member 128 having slots 129 receiving the transverse bar 85 on the reciprocating valve member. This provides a lost motion connection between link 125 and the valves.

As shown in FIGS. 1 and 7, the piston in cylinder 31 is ready to start a power stroke, the piston in cylinder 32 has just completed a power stroke, the piston in cylinder 33 is in the middle of a power stroke and the piston in cylinder 34 is in the middle of a discharge stroke. FIGS. 3–6 show the positions of valves 71-74 at this instant in forward travel when speed control valve mechanism 90 in FIG. 10 is in low speed position.

In FIG. 3 the protuberance 108 on cam 101 has just shifted cage 105 and valve 71 to the left, causing the hydraulic fluid to flow from the pressure chamber 66 through port 84, chamber 75 and hydraulic line 51 to start the power stroke of the piston in cylinder 31.

In FIG. 4 the protuberance 108 on cam 102 has just shifted cage 105 and valve 72 to the right, connecting cylinder 32 through hydraulic line 52, chamber 75 and port 82 to relief chamber 67, for the beginning of the discharge stroke of the piston in cylinder 32.

Figure 5:
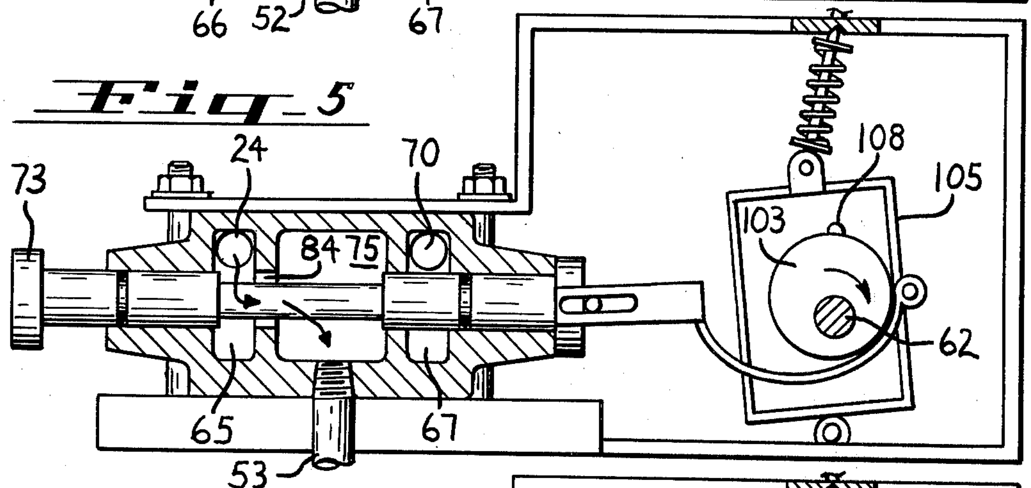

In FIG. 5 cam 103 has made a quarter turn following the shifting of cage 105 and valve 73 to the left, the piston in cylinder 33 being in mid-power stroke under the pressure of hydraulic fluid flowing into the cylinder through hydraulic line 53, chamber 75 and port 84 from pressure chamber 65.

Figure 6:
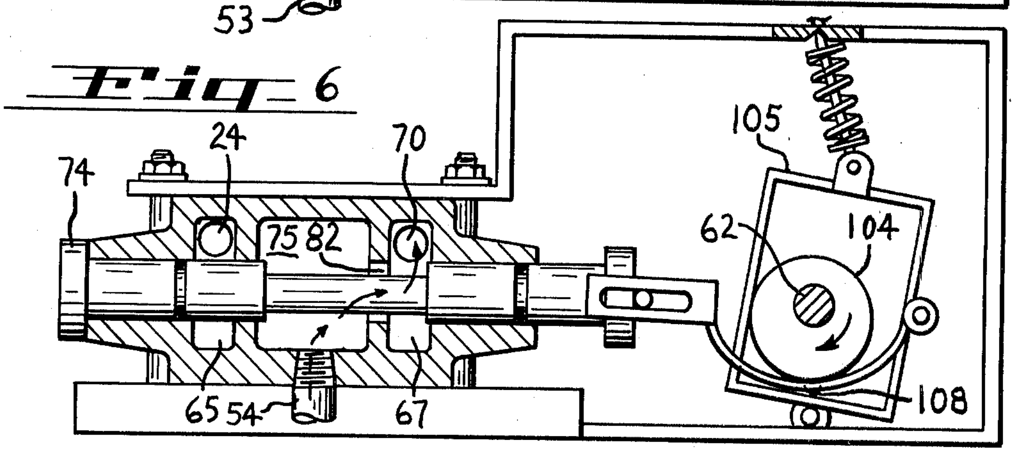

In FIG. 6 cam 104 has made a quarter turn after shifting cage 105 and valve 74 to the right, to continue the discharge from cylinder 34 through hydraulic line 54, chamber 75 and port 82 to relief chamber 67.

FIGS. 3-6 considered in a different order also illustrate the sequence of valve positions for each of the valves 71-74. Thus, FIG. 3 shows the valve and cam positions at the beginning of each power stroke in a forward direction of travel. FIG. 5 shows the valve and cam positions at the mid-point in the power stroke, FIG. 4 shows the valve and cam positions at the beginning of the discharge stroke and FIG. 6 shows the valve and cam positions at mid-point in the discharge stroke.

When speed control valve mechanism 90 in FIG. 10 is rocked clockwise to depress valve 93 and raise valve 91, the full output of pump 15 is circulated through only two of the four cylinders for high speed operation. This valve movement closes communication between chambers 65 and 66 and puts the latter chamber into communication with relief chambers 67, 68. Pressure fluid from chamber 65 is then distributed only to the two cylinders 33 and 34 and the other two cylinders 31 and 32 are connected continuously through their hydraulic lines 51 and 52 and chambers 66 and 67 to relief or discharge line 70.

Figures 2, 11, 12, 13:
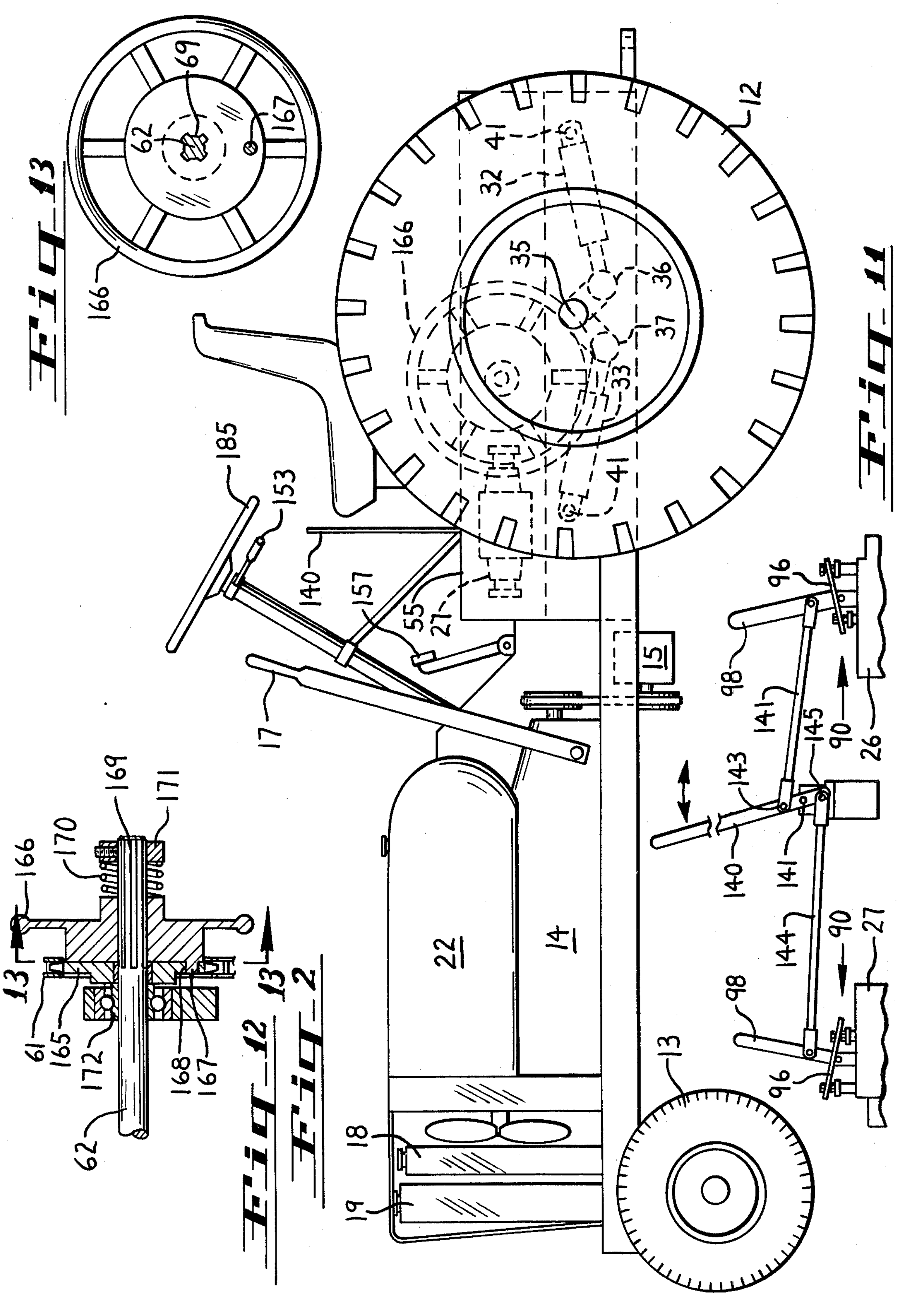
FIG. 2 is a side elevation view of a tractor embodying the invention.
FIG. 11 is a view showing the linkage for shifting both speed change valves.
FIG. 12 (sheet 2) is a view on the line 12—12 in FIG. 1 showing the timing adjustment means on one of the camshafts for reverse drive.
FIG. 13 is a view on the line 13—13 in FIG. 12.

The speed control valve mechanisms 90 in the two valve units 26 and 27 are connected together for simultaneous operation as shown in FIG. 11. A hand lever 140 is pivotally mounted at 141. A link 142 from the lever 98 on valve unit 26 is connected to a pin 143 above the pivot 141 and a link 144 from the lever 98 on valve unit 27 is connected to a pin 145 on hand lever 140 below its pivot 141. Thus, movement of hand lever 140 shifts the motors 28 and 29 for both wheels 11 and 12 to either low speed or high speed operation as desired.

Referring back to FIG. 1, the speed of the vehicle is further controlled by a throttle valve 150. This is a bypass valve, which returns hydraulic fluid from pressure line 21 back to a relief or a return line 151 which returns the system fluid to radiator 19 and pump 15. When valve 150 is fully opened no pressure is developed in lines 24 and 25 to operate the wheel motors. As valve 150 is gradually closed, the pressure increases in pressure lines 24 and 25, and when valve 150 is fully closed the full pressure of pump 15 is established in lines 24 and 25 and the entire output of the pump is circulated through the wheel motors 28 and 29. Throttle valve 150 is adjusted by a link 152 connected to a hand level 153.

Braking is effected by a pair of brake valves 155 which throttle the return flow from the wheel motor cylinders that is discharged from each of the valve units 26 and 27 through their relief or discharge lines 70. These brake valves are preferably operated individually by links 156 connected respectively to a left brake pedal 157 and a right brake pedal 158.

The present hydraulic drive system is well adapted for driving an endless track or crawler type tractor and in such use individual left and right brake pedals are convenient for steering purposes. In a wheeled vehicle, the two links 156 may be connected to a single brake pedal when desirable.

Means for changing the timing of the valves in valve units 26 and 27 to drive either one or both drive wheels 11 and 12 in reverse direction are shown in FIGS. 12 and 13. In the case of the motor 28 for drive wheel 11 the chain 61 rotates a sprocket 165 which turns freely on camshaft 62. Sprocket 165 is normally connected to camshaft 62 by a hand wheel 166 having a lug 167 which is engaged in a hole 168 in the sprocket.

Hand wheel 166 is mounted on a splined end portion 169 of the camshaft so that the and wheel will rotate the camshaft while permitting axial movement of the hand wheel. A compression spring 170 holds the lug 167 engaged in hole 168. Spring 170 is compressed between an end collar 171 and the hub of hand wheel 166. Under the action of spring 170 the hand wheel 166 presses sprocket 165 against the inner face of a bearing assembly 172 which supports that end of the camshaft.

When it is desired to reverse the rotation of the motor for wheel 11 the hand wheel 166 is pulled outward away from sprocket 165 to disengage lug 167 from hole 168. Then the hand wheel is rotated in reverse direction for one full turn until lug 167 snaps back into hole 168 under the action of spring 170. This rotates camshaft 62 one turn in reverse direction.

The results of a one turn reverse rotation of camshaft 62 will be apparent in FIGS. 3–6. In FIG. 3 a half turn rotation of cam 101 counter to the direction of arrow 109 shifts cage 105 and valve 71 from left to right and the remaining half turn of the cam shifts cage 105 and valve 71 back to the left as shown. Cylinder 31 in FIG. 7 thereby receives hydraulic fluid under pressure to advance its piston as soon as crank pin 36 moves off dead center position.

Similarly, in FIG. 4 a one turn reverse rotation of cam 102 shifts cage 105 and valve 72 first to the left then back to the right returning the valve to exhaust position for the next discharge stroke of the piston in cylinder 32 as soon as crank pin 36 moves off dead center.

In the case of cam 103 and valve 73 in FIG. 5 the first half turn of rotation in reverse direction has no effect. The next half turn shifts cage 105 and valve 73 to the right, shifting the valve from intake to discharge position. This allows the piston to retract in cylinder 33 when crank shaft 35 reverses from clockwise to counterclockwise rotation in FIG. 7.

Similarly, the first half turn of reverse rotation of cam 104 in FIG. 6 has no effect. The next half turn shifts cage 105 and valve 74 to the left, from discharge to intake position. Hydraulic fluid is thereby admitted to cylinder 34 to extend its piston and start reverse, counterclockwise, rotation of crank shaft 35 in FIG. 7.

The two hand wheels 166 for the two camshafts 62 and 63 may be positioned on opposite sides of the operator so that he can grasp one in each hand and pull them toward him to disengage each lug 167 from its associated sprocket. To reverse both drive wheels 11 and 12 all that is necessary then is to spin both hand wheels in a direction counter to the direction in which they have been rotating during forward travel.

After one complete turn, the spring 170 acting on each hand wheel will return the lug 167 to the hole 168 in its companion sprocket as shown in FIG. 12.

When only one of the drive wheels 11 or 12 is to be reversed, only the hand wheel 166 on that side of the vehicle is manipulated in the manner described to reverse the motor for that wheel. The other drive wheel 11 or 12 may be held stationary by its brake pedal 157 and 158 or left in forward drive, as desired. These manipulations assist the steering wheels 13 in making a sharp turn left or right and in the case of a crawler tractor permit the tractor to be turned around on its own center.

It is also within the scope of the invention to provide electric motor means for engaging and disengaging cam shafts 62 and 63 from their associated sprockets and for rotating the camshafts individually or in unison relative to their associated sprockets, by switch controls convenient to the operator.

After a motor for a drive wheel 11 or 12 has been reversed, forward travel may be resumed by again pulling the hand wheel 166 in an axial direction to disengage lug 167 from hole 168 and then rotating the hand wheel 166 one full turn in a forward direction until spring 170 reengages the lug 167 with hole 168. This reverses the above described valve movements in FIGS. 3-6 and returns the valves 71-74 to the relative positions shown.

Referring back to FIG. 1, the internal combustion engine 14 may be controlled by a governer to run at constant speed or it may be controlled by other suitable means. When the vehicle is standing still with engine 14 running, hydraulic throttle valve 150 is in full open position returning the entire output of pump 15 back to the intake of the pump through hydraulic line 21, throttle valve 150, hydraulic line 151, radiator 19 and hydraulic line 20, whereby there is no hydraulic pressure transmitted through hydraulic lines 24 and 25 to the valve units 26 and 27 to operate the cylinders of the wheel motors.

To start the vehicle, hand wheels 166 are rotated, if necessary, to change the timing of camshafts 62 and 63 for forward or reverse travel as desired. Then throttle valve 150 is gradually closed by lever 153 to increase the hydraulic pressure in lines 24 and 25 and valve units 26 and 27 and develop working pressure in the cylinders of the motors 28 and 29 for drive wheels 11 and 12.

When throttle valve 150 is fully closed, the entire output of pump 15 is circulated through valve units 26 and 27 and the cylinders of the drive wheel motors receive full pump pressure. Brake valves 155 are then wide open, delivering the discharge from both wheel motors through hydraulic line 180 to the tank 55 containing the motor 28 for drive wheel 11. This discharge passes through pipe 57 to the tank 55 containing the motor 29 for drive wheel 12 and then to return line 151.

Travel of the vehicle is slowed or stopped by partially or fully closing brake valves 155, which retard or stop discharge stroke movements of the pistons in the cylinders of the drive wheel motors. When this occurs, the pump 15 is protected by relief valve 181 which returns the pump flow through return line 151 at the maximum working pressure of the hydraulic system. In making a sharp turn, only one of the brake valves 155 may be closed to stop, or substantially stop, rotation of the drive wheel 11 or 12 on that side of the vehicle while allowing the motor for the other drive wheel to continue to operate.

The tractor in FIG. 2 operates in the same manner as the swather in FIG. 1. In this case a pair of front wheels 13 are steerable by steering wheel 185 and a pair of rear wheels corresponding to wheels 11 and 12 in FIG. 1 are driving wheels driven by motors 28 and 29. The engine 14 may be controlled by a governor or by a hand throttle.

What is claimed is:

1. In a vehicle, a pair of drive wheels on opposite sides of the vehicle mounted on a pair of crankshafts, individual hydraulic motors for said wheels having cylinders and pistons connected with said crankshafts, a pair of valve units controlling the flows of hydraulic fluid through the cylinders of the respective motors, a pair of camshafts driven by said motors for operating valves in the respective valve units, a pump supplying a hydraulic drive system including said motors and valve units, and an engine driving said pump, each of said motors having four single acting cylinders, each of said crankshafts having two crank pins in right angle relationship, the pistons in two of said cylinders being connected to one of said crank pins and the pistons in the other two cylinders being connected to the other crank pin, pivotal supports for the head ends of two of said cylinders on one side of said crankshaft, and pivotal supports for the head ends of the other two cylinders on the opposite side of said crankshaft, said crankshaft and pivotal supports all having axes in a common horizontal plane.

2. A vehicle as defined in claim 1 including means in said valve units for directing the flow of pressure fluid from said pump to fewer than all of said cylinders in each motor to provide variable speed operation.

3. A vehicle as defined in claim 1 including a throttle valve in said hydraulic system arranged to return hydraulic fluid from the pressure side of said pump to the inlet side of the pump, and an individual brake valve for each of said motors arranged to restrict the discharge of hydraulic fluid from said motor.

4. A vehicle as defined in claim 1, the motor and valve unit for each of said wheels being disposed in a tank to contain leakage from said motor and valve units.

5. A vehicle as defined in claim 1, including individual means for rotating each of said camshafts relative to its driving crankshaft to change the valve timing for driving either one or both of said wheels in reverse direction.

6. In a vehicle, a pair of drive wheels on opposite sides of the vehicle mounted on a pair of crankshafts, individual hydraulic motors for said wheels having cylinders and pistons connected with said crankshafts, a pair of valve units controlling the flows of hydraulic fluid through the cylinders of the respective motors, a pair of camshafts driven by said motors for operating valves in the respective valve units, a pump supplying a hydraulic drive system including said motors and valve units, and an engine driving said pump, each of said valve units containing a spool valve for each cylinder of the motor controlled by said valve unit, cams on said camshaft arranged to reciprocate said valves, each valve having a reduced midportion in a center chamber connected to one of said cylinders, pressure and relief chambers on opposite sides of said center chamber having ports concentric with said valve communicating with said center chamber, and enlarged end portions on said valve for closing said ports, said end portions being spaced apart from each other a distance greater than the distance between said pressure and relief chambers so that said valve cannot close both of said ports simultaneously, said relief chamber serving all the valves in said valve unit and all the cylinders in said motor, and said pressure chamber serving fewer than all of said valves and cylinders, a second pressure chamber serving the remaining valves and cylinders for low speed operation, and valve means shutting off fluid pressure supply to said second pressure chamber and connecting said second pressure chamber to said relief chamber for high speed operation.

7. In a vehicle, a pair of drive wheels on opposite sides of the vehicle mounted on a pair of crankshafts, individual hydraulic motors for said wheels having cylinders and pistons connected with said crankshafts, a pair of valve units controlling the flows of hydraulic fluid through the cylinders of the respective motors, a pair of camshafts driven by said motors for operating valves in the respective valve units, a pump supplying a hydraulic drive system including said motors and valve units, and an engine driving said pump, each of said valve units containing a spool valve for each cylinder of the motor controlled by said valve unit, cams on said camshaft arranged to reciprocate said valves, each valve having a reduced midportion in a center chamber connected to one of said cylinders, pressure and relief chambers on opposite sides of said center chamber having ports concentric with said valve communicating with said center chamber, and enlarged end portions on said valve for closing said ports, said end portions being spaced apart from each other a distance greater than the distance between said pressure and relief chambers so that said valve cannot close both of said ports simultaneously, and snap acting means operable by said cams for shifting said valves quickly in their reciprocating movements.

8. A vehicle as defined in claim 7, said snap acting means comprising a rockable cage around each cam, said cage being wider than said cam, an over center spring biasing said cage in either of two opposite positions away from a center position, and a link connecting said cage with the valve operated by said cam.

9. A vehicle as defined in claim 8, said link having a spring arm on one end connected with said cage and a lost motion connection with said valve on its opposite end.

10. In a vehicle, a pair of drive wheels on opposite sides of the vehicle mounted on a pair of crankshafts, each crankshaft having a pair of crank pins in right angle relationship; individual motors for driving said wheels, each motor comprising a pair of single acting cylinders having pistons connected to one of said crank pins and a pair of single acting cylinders having pistons connected to the other crank pin, pivotal supports for the head ends of two of said cylinders on one side of said crankshaft, pivotal supports for the head ends of the other two cylinders on the opposite side of said crankshaft, said crankshaft and pivotal supports all having axes in a common horizontal plane; a pair of valve units controlling the flows of hydraulic fluid through the cylinders of the respective motors, spool valves in said valve units, a pair of camshafts driven by the respective crankshafts for reciprocating said valves, snap acting means operable by said camshafts for shifting said valves quickly in their reciprocating movements, individual means for rotating each of said camshafts relative to said crankshafts to change the valve timing for driving either one or both of said drive wheels in reverse direction, valve means in said valve units for directing hydraulic fluid selectively through all four or only two of said cylinders in each of said motors; an individual brake valve for each of said motors arranged to restrict the discharge of hydraulic fluid from said motor; a pump supplying said hydraulic fluid to said valve units and motors, an engine driving said pump; and a throttle valve arranged to return said hydraulic fluid from the pressure side of said pump to the inlet side of the pump.

* * * * *